United States Patent [19]
Hayes

[11] Patent Number: 5,370,093
[45] Date of Patent: Dec. 6, 1994

[54] CONNECTING ROD FOR HIGH STRESS APPLICATIONS AND METHOD OF MANUFACTURE

[76] Inventor: William A. Hayes, 10250 Davis Rd., Wilton, Calif. 95693

[21] Appl. No.: 95,685

[22] Filed: Jul. 21, 1993

[51] Int. Cl.$^5$ .............................................. F02B 13/00
[52] U.S. Cl. .................. 123/197.4; 74/579 E; 74/588
[58] Field of Search ............... 123/197.4; 74/579 E, 74/587, 588

[56] References Cited

U.S. PATENT DOCUMENTS

| | | | |
|---|---|---|---|
| 1,260,557 | 3/1918 | Layman | 74/588 |
| 1,418,085 | 5/1922 | Layman | 74/588 |
| 3,482,467 | 12/1969 | Volkel | 74/579 |
| 3,482,468 | 12/1969 | DeBiasse | 74/579 |
| 3,730,020 | 5/1973 | DiMatteo | 74/579 E |
| 4,369,742 | 1/1983 | Everts | 123/193 P |
| 4,827,795 | 5/1989 | Machida | 74/579 E |
| 4,836,045 | 6/1989 | Löbig | 74/579 E |
| 4,856,366 | 8/1989 | Nikolaus | 74/587 |
| 5,016,807 | 5/1991 | Haack | 228/170 |
| 5,140,869 | 8/1992 | Mrdjenovich | 74/579 E |

Primary Examiner—Noah P. Kamen

[57] ABSTRACT

A connecting rod having a multiplicity of internal cavities and external pockets that allow optimization of the rod structural properties while minimizing weight. The rod is fabricated as a multiple piece assembly, utilizing wrought materials and metallurgical joining techniques.

5 Claims, 7 Drawing Sheets

CONNECTING ROD FOR HIGH STRESS APPLICATIONS AND METHOD OF MANUFACTURE

BACKGROUND—FIELD OF INVENTION

This invention relates to connecting rods for reciprocating, internal combustion engines and the like. In particular, it relates to connecting rods for applications for high-output engines where strength-to-weight ratios and cycle life are critical.

BACKGROUND—DISCUSSION OF PRIOR ART

The prior art, specifically U.S. Pat. No. 3,482,467 to Volkel (1969), U.S. Pat. No. 3,482,468 to De Biasse (1969) and U.S. Pat. No. 3,730,020 to Di Matteo (1973), adequately describe the problems associated with the operational aspects of a connecting rod in high-output applications. The sited references all describe the severe stresses imposed on the connecting rod by combustion and inertial forces. The references also indicate the desire for a minimum weight connecting rod that can withstand these imposed stresses. This can be considered a desire to maximize a ratio of the strength of the rod to the weight, or mass, of the rod.

The strength-to-weight ratio, hereinafter referred to as S/W, can take on multiple forms. First, it can be considered the tensile or compressive yield strength as related to the total mass of the rod. This is an indication of the efficiency of the rod under the normal loading conditions of combustion caused compressive forces and inertia caused compressive and tensile forces. However, there are other important stresses that need to be considered. These include bending stresses in planes both normal to, and parallel to, a plane passing through the crank pin and the piston pin bores. Such stresses can be the result of frictional forces acting at the crank and piston pins, but are more normally caused by unsymmetrical loading resulting from engine design geometry and combustion anomalies.

All of the above described loading conditions are cyclic in nature; as such, a more realistic efficiency indicator is a consideration of the fatigue strength of the rod as related to the total rod mass. This embodiment of the S/W ratio is the most important for cycle life critical applications and is the one considered in these discussions.

Much of the prior art has attempted to maximize the S/W ratio by using low density materials of construction such as alloys of aluminum. U.S. Pat. No. 3,482,468 to De Biasse (1969) describes such an approach. The problem with aluminum alloys, and in fact all nonferrous materials, is that they do not exhibit a stress level below which they can be cycled indefinitely, i.e., an endurance limit. That is to say, a connecting rod of aluminum construction will exhibit fatigue at any stress or loading level if cycled enough times.

As opposed to designing for endurance limit, or infinite life, a common practice is to design for finite life. As an example of such an approach, consider the following: The fatigue strength of a representative steel is $120 \times 10^3$ pounds per square inch (p.s.i.) at $10^6$ cycles. For a connecting rod this number of cycles is equivalent to only slightly over two hours of operation at 8000 revolutions per minute (RPM). At the same number of cycles the fatigue strength of a representative aluminum alloy is $28 \times 10^3$ p.s.i. For equivalent cycle life, a connecting rod made of aluminum would have to be 4.3 times larger in loaded area than one made of steel. Comparison of the densities of the two materials shows aluminum to be 2.9 times lighter than steel. In terms of S/W ratios based on density, the steel rod has a $4.24 \times 10^5$ S/W compared to $2.86 \times 10^5$ for the aluminum rod, or 48% greater.

The higher S/W ratio for the steel rod, coupled with the fact that it can be designed for operation at infinite cycle life, makes it the superior material of construction. A similar analysis can be performed for titanium and other light weight metals.

Another approach to maximizing the S/W ratio is by optimizing the placement of the material in the various cross sections of the rod. Attempts at this are shown in U.S. Pat. No. 3,482,467 to Volkel (1969), U.S. Pat. No. 4,827,795 to Machida (1989) and U.S. Pat. No. 5,140,869 to Mrdjenovich (1992). The common problem with these approaches is that they rely on casting processes as the method of manufacture. Castings are traditionally considered undesirable for highly stressed, cyclically loaded parts because of concerns over material homogeneity and inherent dimensional control problems. Further, Volkel's design requires inserts to be fusion welded into place to close-out internal cavities. Such welding can produce thermally induced residual stresses and inconsistent weld joint properties. This leads to further concerns over cycle life of this particular design.

The prior art also stresses the desire to maximize the section modulus near the crankshaft pin end, in what is commonly referred to as the rod beam or shank. This may, in fact, be a misconception resulting from reported failures that occurred when material was removed from this area in an attempt to reduce rod weight. It is known that in certain cases what actually occurred was the development of stress concentrations as a result of abrupt changes in part geometry, and the reduction of the load carrying cross sectional area below its minimum allowable for the application. In any case, merely increasing the section modulus in this area, does not insure structural adequacy at minimum weight.

OBJECTS AND ADVANTAGES

Accordingly, several objects and advantages of my invention are:

(a) to provide a connecting rod with an optimized strength to weight ratio;

(b) to provide a connecting rod manufacturable from material with high fatigue strength and from those that exhibit an endurance limit;

(c) to provide a connecting rod manufacturable from wrought materials as opposed to castings;

(d) to provide a connecting rod with optimized structural properties at any given cross section;

(e) to provide a connecting rod with reduced surface area resulting in an aerodynamic profile that does not entrap or entrain engine lubricating oil;

(f) to provide a connecting rod that, through its unique features, imparts reduced loads upon mating engine parts during operation;

(g) to provide a connecting rod that has a crank pin end that is highly resistant to distortion during operation allowing for lessened crank pin bearing clearances and subsequently improved engine lubrication efficiency.

Further objects and advantages of my invention will become apparent from a consideration of the description and drawings.

Figure 1:
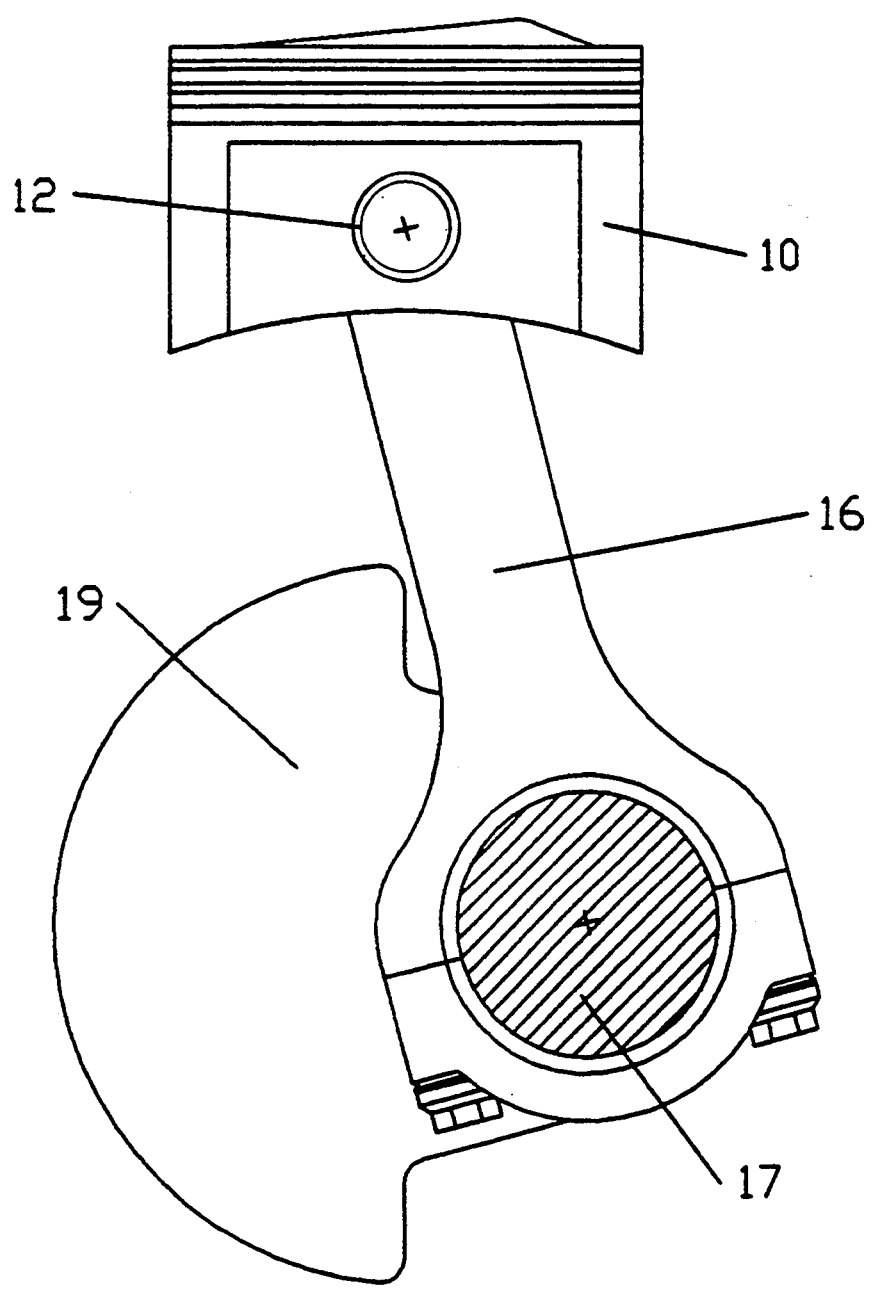
FIG. 1 shows the major mechanical components of a reciprocating internal combustion engine.

Reference Numerals in Drawings:

| | | | |
|---|---|---|---|
| 10. | piston | 12. | piston pin |
| 13. | wall | 14. | small end of shank portion |
| 15. | shank portion | 16. | connecting rod |
| 17. | crankshaft pin | 18. | cap |
| 19. | crankshaft | 20. | piston pin bushing |
| 22. | piston pin oiling tube | 23. | threaded hole |
| 24. | cap locating sleeve | 25. | through hole |
| 26. | cap connecting stud | 27a. | front wall |
| 27b. | back wall | 28. | cap connecting bolt |
| 29a. | side wall | 29b. | opposing side wall |
| 30. | washer | 32. | nut |
| 34a. | faying surface | 34b. | faying surface |
| 35a. | pocket | 35b. | pocket |
| 36. | major internal cavity | 38. | piston pin bore |
| 40. | crankshaft pin bore | 42. | plane of tangency |
| 43. | internal cavity, shank | 44. | external pocket - side |
| 45. | external pocket - face | 46. | external pocket - face |
| 47. | external pocket - side | 48. | internal cavity, cap |
| 49. | counterbore | 50. | cap major internal cavity |
| 51a. | pocket | 51b. | pocket |
| 52a. | wall | 52b. | wall |
| 53a. | pocket | 53b. | pocket |
| 54. | wall | 55a. | pocket |
| 55b. | pocket | 56a. | left half |
| 56b. | right half | 58. | center member |
| 60a. | left outer member | 60b. | right outer member |
| 61. | thru-hole | 62a. | pocket |
| 62b. | pocket | | |

DETAILED DESCRIPTION OF THE PREFERRED EMBODIMENTS

FIG. 1 shows the typical assembly of a reciprocating internal combustion engine. Piston 10 is connected to a connecting rod 16 by means of a piston pin 12. The connecting rod 16 in turn connects to a crankshaft pin 17 of the crankshaft 19.

Figure 2:
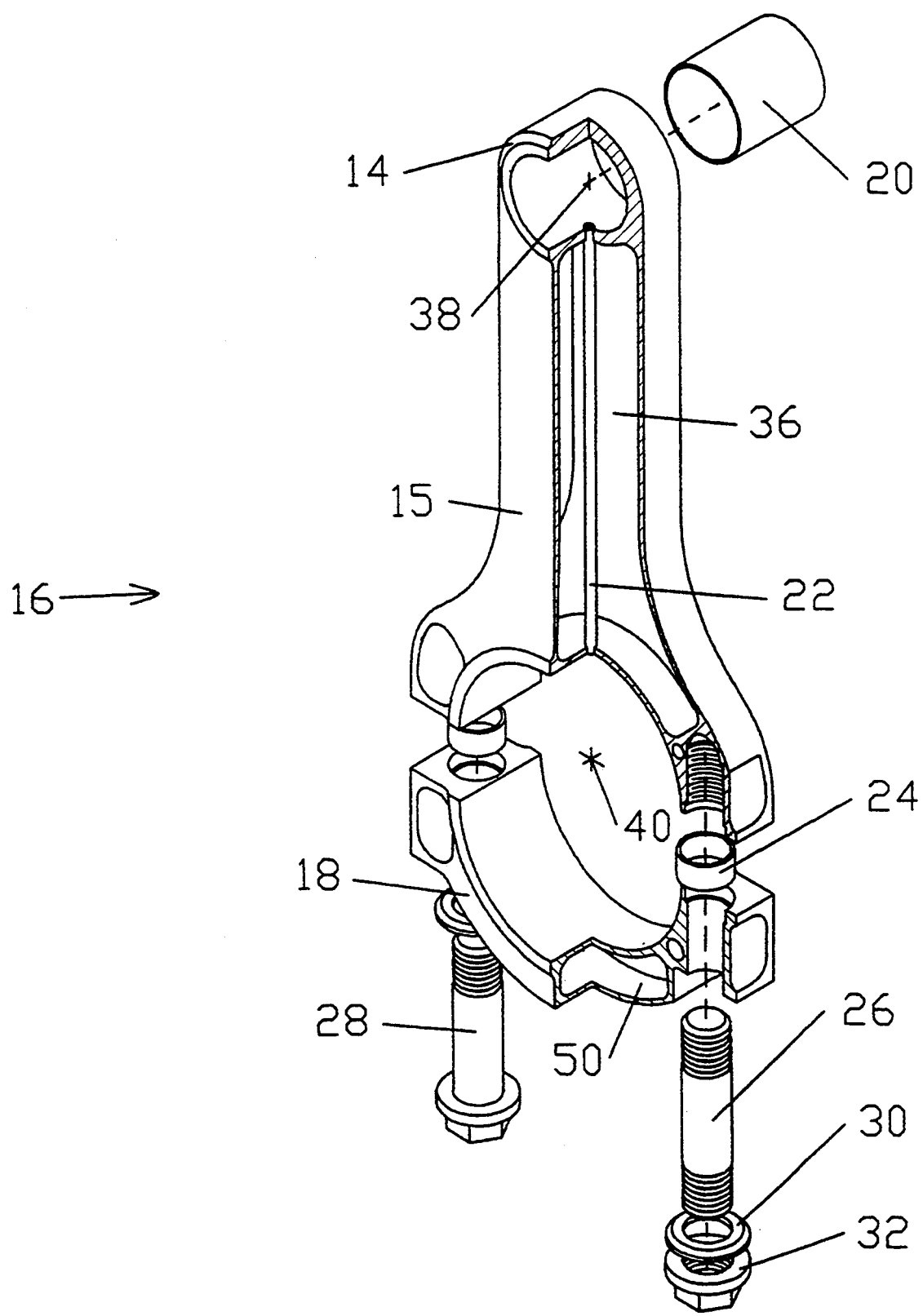
FIG. 2 is an exploded isometric view of the present invention: the connecting rod and its components.
Figure 3:
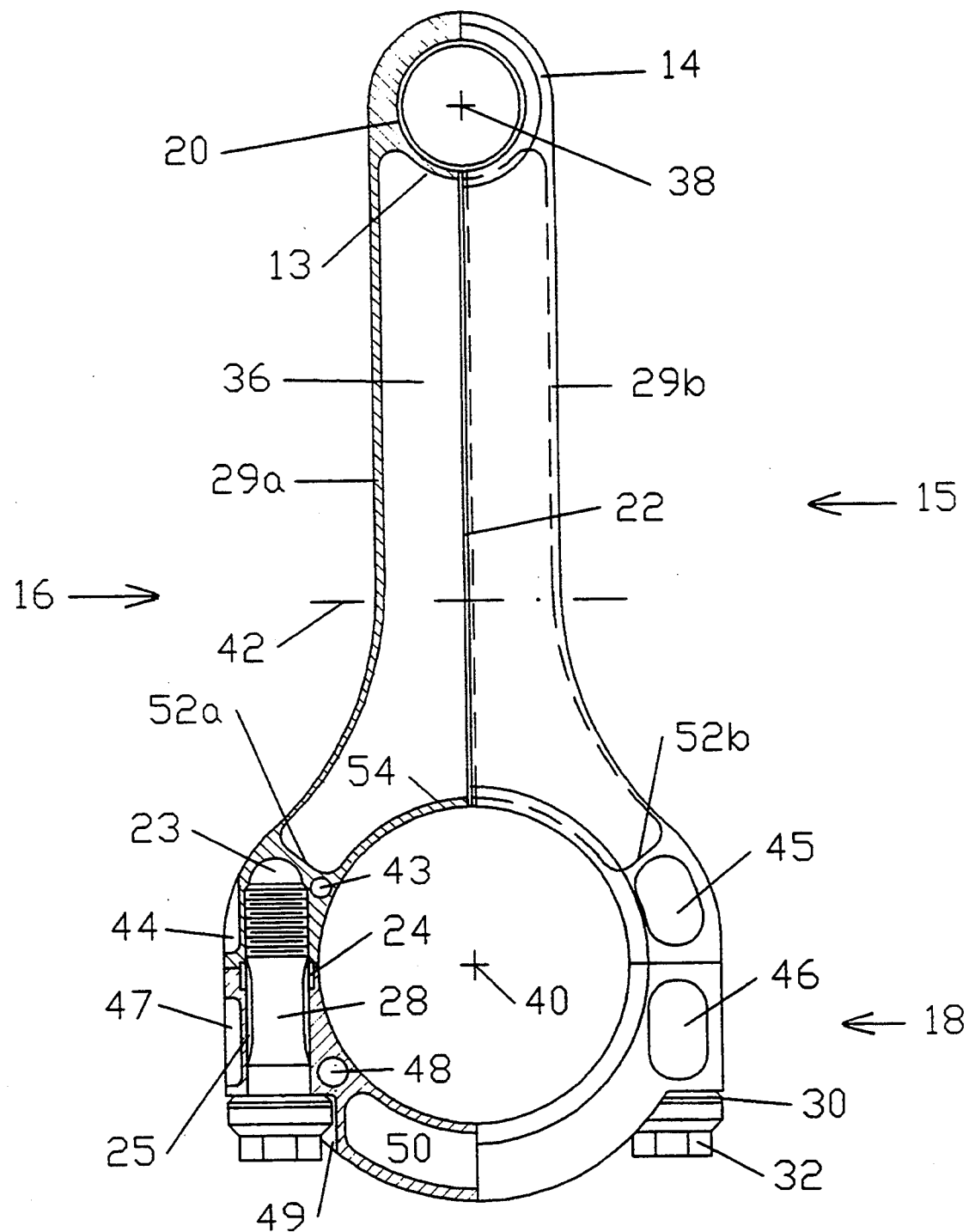
FIG. 3 is a plan view of the assembled connecting rod, the left half of which is shown as a sectional view.
Figure 4:
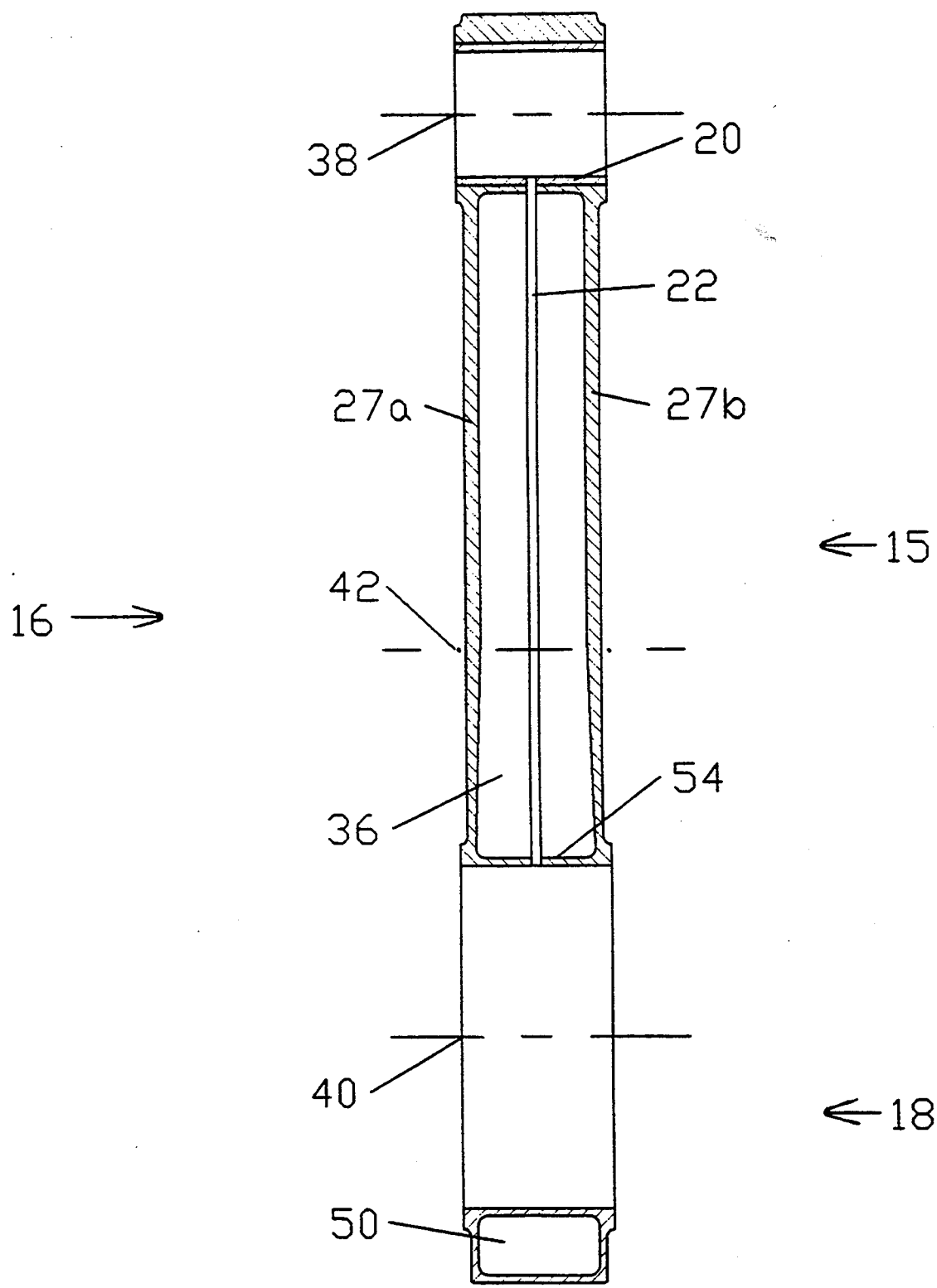
FIG. 4 is a cross section of the connecting rod taken at a plane intersecting its two major bores.

FIGS. 2, 3 and 4 show various views of the present invention. Referring to these figures it is seen that the connecting rod 16 is comprised of a shank portion 15 and a cap portion 18. The enclosed cylindrical small end 14 of the shank portion 15 has a bore 38, which is fitted with a bushing 20 that accepts the aforementioned piston pin 12. The shank portion 15 contains a major internal cavity 36, which is formed by walls 13, 27a, 27b, 29a, 29b, 52a, 52b, and 54. The shank portion 15 also contains additional internal cavities 43, and external pockets 44 and 45. The end of the shank portion 15 opposite the small end 14 is bifurcated to accept the crankshaft pin 17. The closeout of the aforementioned bifurcation is made by a cap portion 18, thus forming the crankshaft pin bore 40. The cap portion 18 contains a major internal cavity 50, additional internal cavities 48, and external pockets 46 and 47.

Connection of shank portion 15 and cap portion 18 is made by stud 26, washer 30 and nut 32; or alternately by bolt 28 and washer 30. Through holes 25 are provided in the cap portion 18 and threaded holes 23 are provided in the shank portion 15 to allow insertion and attachment of the stud 26 or bolt 28. A counterbore 49 is provided in the cap portion 18 to provide a seat for the washer 30. Sleeves 24 are provided at the interface of shank portion 15 and cap 18 to facilitate relative alignment between these two components.

By proper sizing, shaping and placement of the internal cavities 36 and 43 relative to the exterior contours, and by proper sizing and placement of pockets 44 and 45, a constant cross sectional area can be maintained in the shank portion 15 between bores 38 and 40. Maintaining a constant cross-sectional area produces an optimum design from a strength-to-weight standpoint as all cross-sections are stressed equally under normal compressive and tensile forces.

The cross-sectional area can be optimized for the given material and loading conditions. Current state-of-the art connecting rod design, because of its outside-in-construction cannot achieve this optimum and remain structurally sound in the crank pin area. The manner in which the present invention maintains constant cross-section is shown by FIGS. 3 and 4. In the shank portion 15 the walls 27a, 27b, 29a, and 29b, from the piston pin wall 13 to the plane of tangency 42, form an essentially rectangular cross-section of constant wall thickness and thus constant cross-sectional area. As the shank portion 15 bifurcates to form the upper portion of the crankshaft pin bore 40 the shank flares outward. This flaring begins at the plane of tangency 42. From this point to the interior walls 52a, 52b and 54, all four walls 27a and 27b, and 29a and 29b are tapered. At any given cross-section in this region, the tapering maintains the cross-sectional area equal to that of the aforementioned rectangular region.

The actual value of the cross-sectional area is a function of the particular applicable loading requirements coupled with the properties of the material of construction. By displacing walls 27a and 27b and walls 29a and 29b as far apart as the application envelope constraints will allow, the section modulus at any given cross-section is maximized. In the area surrounding the threaded hole 23 there are internal cavities 43 and external pockets 44 and 45, used to optimize the section properties by allowing the removal of excess material.

Further, the cap portion 18 may be optimized by proper sizing and location of cavity 50 relative to its exterior contours and by proper sizing and placement of internal cavities 48 and exterior pockets 46 and 47. In this manner the entire connecting rod 16 is optimized based on its material and material properties while minimizing mass or weight.

In a typical application, comparing to a current state-of-the art design, the present invention provides a weight reduction of 20% while maintaining the same tensile and compressive strength, yet increases the bending strength by 10% and 70%, respectively, in planes normal to and parallel to bore 38 and 40. Due to the inherent manner of material optimization when utilizing the concept of constant cross-sectional area of the present invention, the majority of the weight reduction occurs at the crankshaft pin bore 40 end of the rod shank. This is particularly important as this is considered rotating weight in the assembly of FIG. 1. As such, any reduction in the rotating weight translates to a reduction in the dynamically imposed loading and resultant stresses on the crankshaft 19 and in turn its mating parts in the engine assembly. In this example, the 20% weight reduction amounted to 100 grams. When operating at an engine speed of 8000 revolutions per minute this 100 gram per rod weight reduction resulted in a dynamic force reduction of 1400 pounds acting on each crankshaft pin 17. These reductions significantly increased the fatigue life of the entire engine assembly.

The present invention provides an extremely rigid structure around the crankshaft pin 17. The use of the internal cavities to optimize the material placement at any given cross-section provides an optimized section modulus at these cross-sections. The rigidity provided by this configuration limits dynamically induced distortion, allowing bearing clearance to be reduced, thus reducing lubricating oil losses.

Further examination of FIGS. 2 and 3 reveals an added benefit of the current invention. Because the concept employs major internal cavities, the external surface area is minimized. This, coupled with its inherent smooth contours makes the rod more aerodynamic and less likely to affect, or be affected by, entrained oil in its surrounding environment. Considering that in the previously described application, rod velocity can exceed 14,000 feet per minute (160 miles per hour), this can be of significance to engine dynamics and lubricating oil control.

For certain applications requiring forced oiling of the piston pin 12, the shank portion 15 can be fitted with tube 22. This tube transfers oil from the crankpin bore 40 to the piston pin 12.

Figure 5:
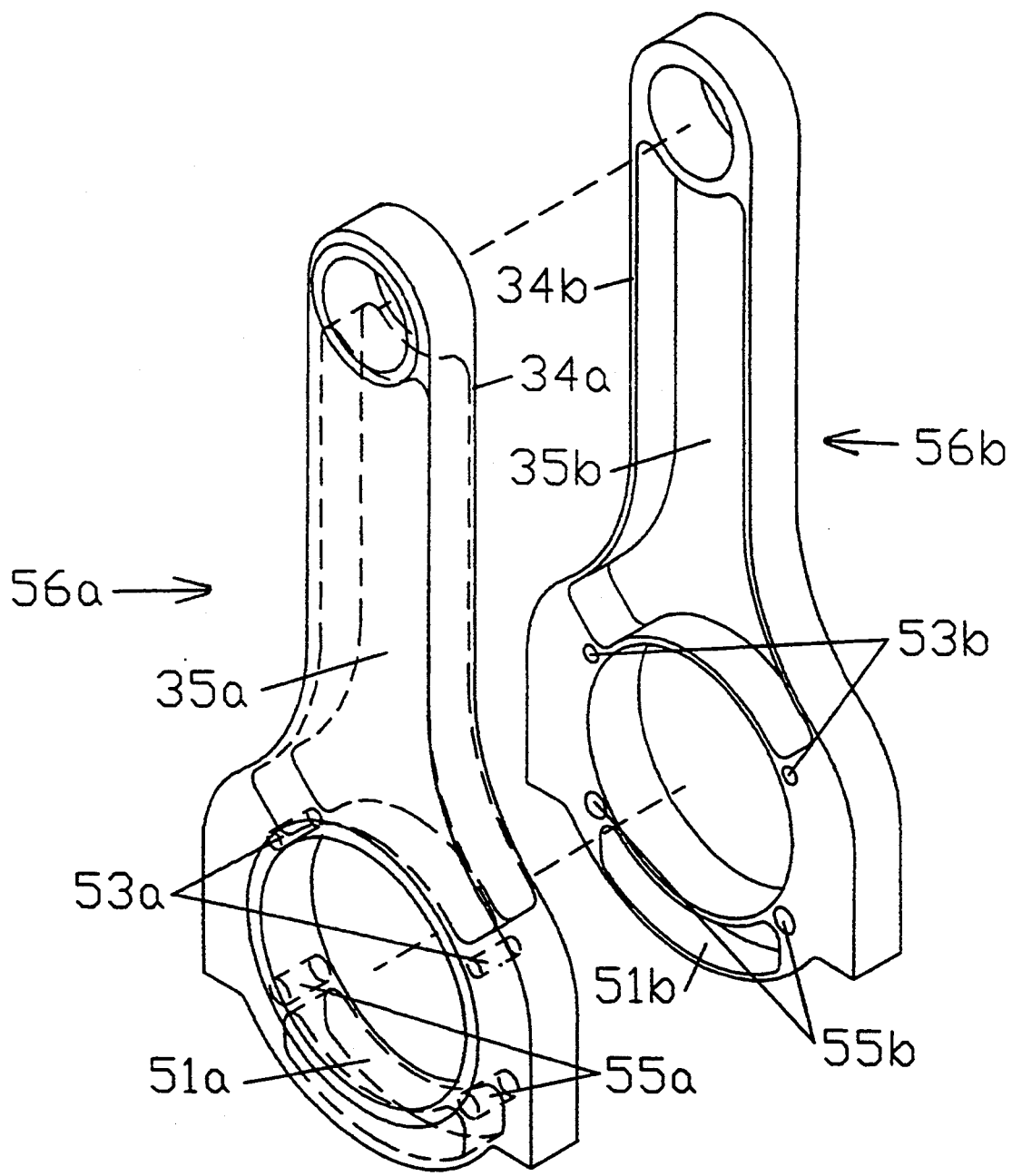
FIG. 5 and 6 are exploded views showing two of the methods of construction related to the method of manufacture.

FIG. 5 shows the preferred embodiment of the novel rod, its method of construction, and the means by which the internal cavities 36, 50, 43 and 48 are formed. The rod is made in two halves, 56a and 56b, which are substantially symmetric about the plane in which they are joined in assembly. This plane lies perpendicular, or normal, to the piston pin bore 38 and the crankshaft pin bore 40 and is shown here represented by faying surfaces 34a and 34b. Pockets 35a, 35b, 51a, 51b, 53a, 53b, 55a and 55b of pre-determined depth are formed by operations such as forging, milling or drilling. When the two halves 56a and 56b are joined together, pockets 35a and 35b form cavity 36; pockets 53a and 53b and pockets 55a and 55b form cavities 43 and 48, respectively; and pockets 51a and 51b form cavity 50. Threaded holes 23, through holes 25 and counterbore 49 are formed during operations after assembly. It can also be seen that the shank portion 15 and the cap portion 18 are constructed as an integral assembly and are later separated as will be subsequently explained.

A major advantage exists in this preferred embodiment. In such an arrangement the joining plane is coincident with the neutral axis in bending of the rod in the plane most susceptible to bending loads. As such, bending load caused tensile and compressive stresses are negligible at the joint. This coupled with the fact that the axial tensile and compressive stresses do not act on this plane, strength of the rod, including fatigue strength, is virtually independent of the joint quality.

Figure 6:
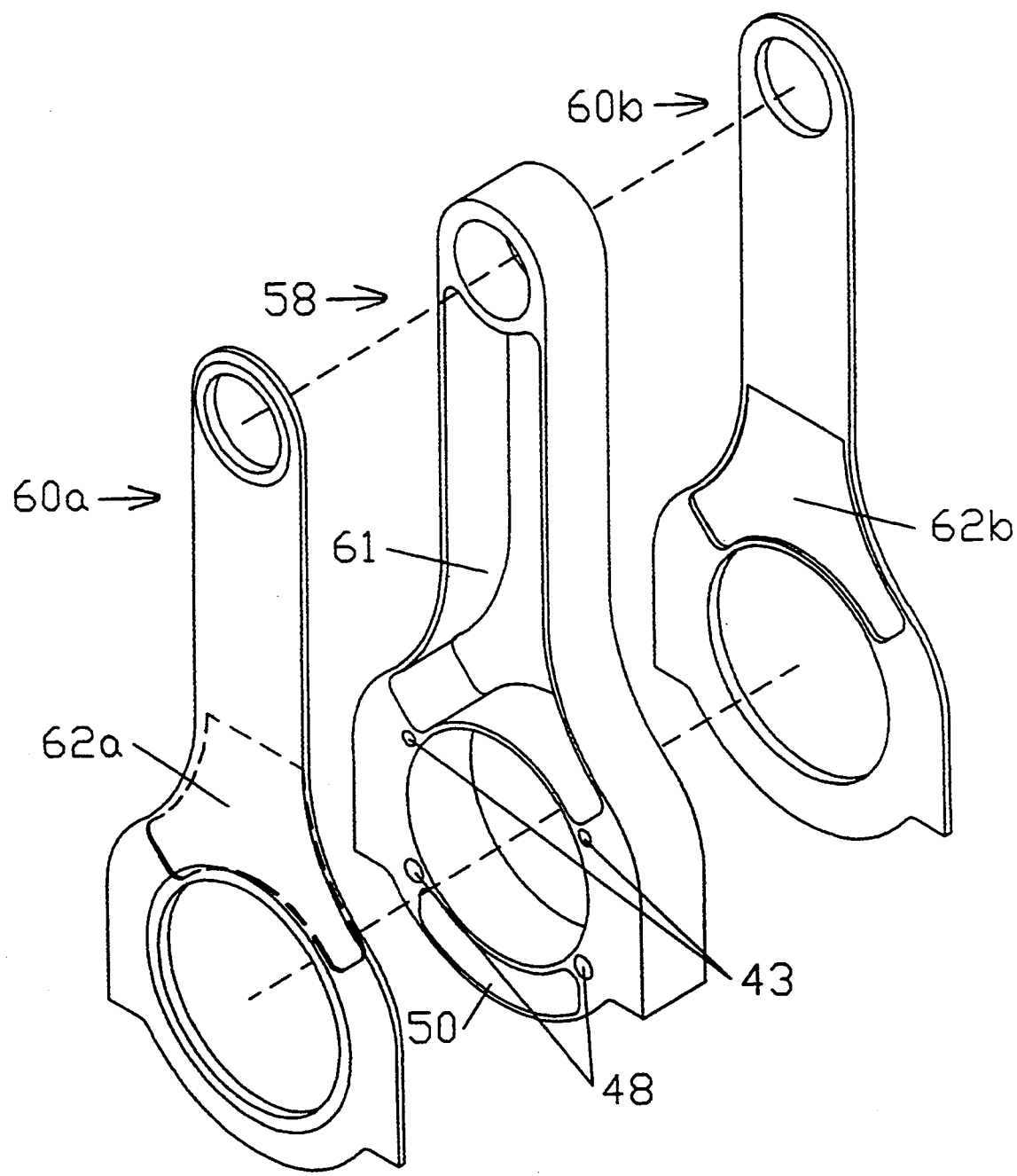

FIG. 6 shows an alternate method of construction of the novel rod. In this embodiment the rod is made of three pieces, having two joining planes that are normal to both the piston pin bore 38 and the crankshaft pin bore 40. The center section 58 contains the major thru-hole 61 and cavities 43, 48, and 50. The outer members 60a and 60b, contain pockets 62a and 62b which provide the tapering of walls 27a and 27b previously described and when assembled combine with thru-hole 61 to form major cavity 36. Although this method of assembly does not share the coincident joint/neutral axis of the first described embodiment, it does provide a potentially less expensive means of manufacture due to inherent wall thickness tolerance control.

Figure 7:
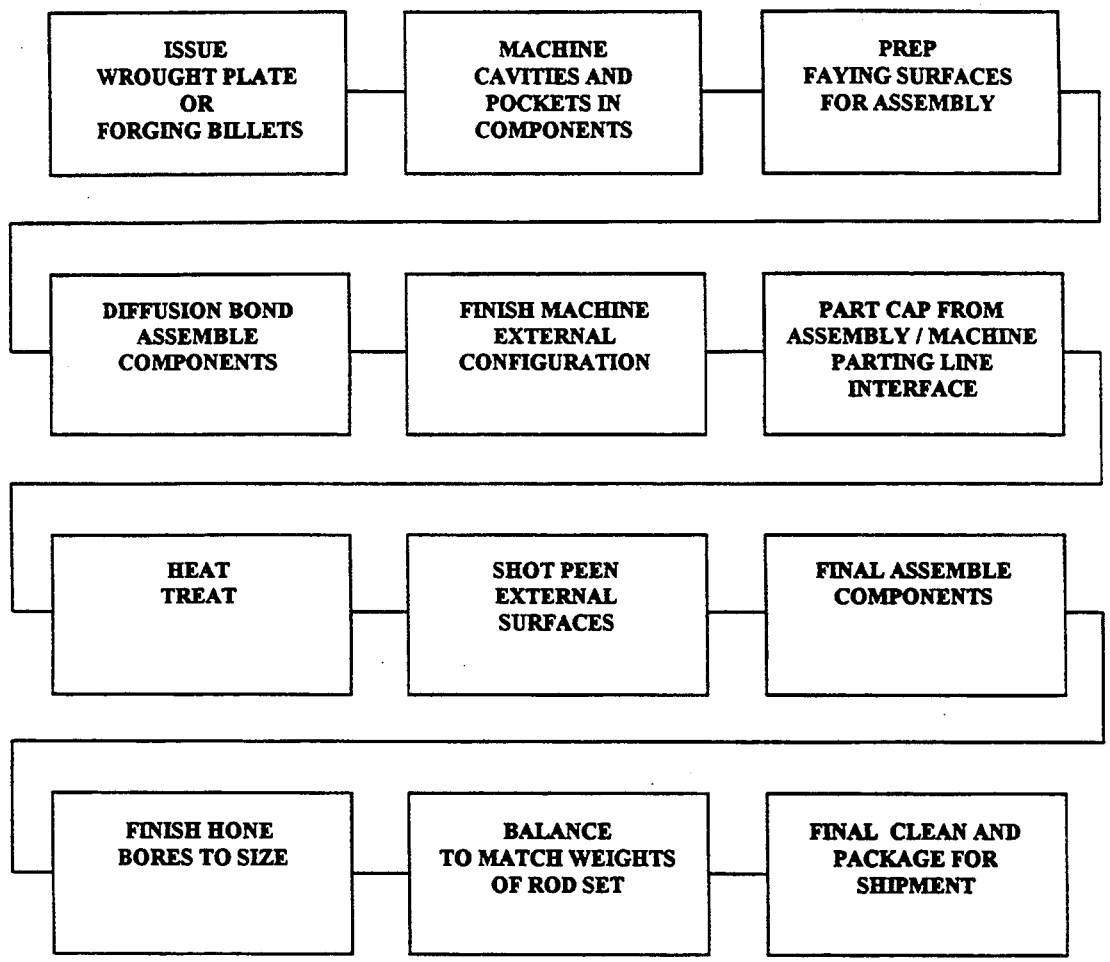
FIG. 7 is a flow chart showing the method of manufacture of the connecting rod.

A method of manufacture for the described embodiments, as well as variations of the invention, is shown in flow chart form in FIG. 7. Beginning with forgings or billet stock, the individual components, 56a and 56b, or alternately 58, 60a and 60b, are first machined to form, or in the case of a forging complete the forming of, the aforementioned internal cavities and faying surfaces. The components are then joined by the preferred metallurgical process of diffusion bonding. This process uses controlled heat, pressure and environment to produce what is essentially a monolithic structure with the joint having the properties of the parent material. Although diffusion bonding is the preferred assembly process, for certain applications other metallurgical joining techniques such as welding or brazing would be acceptable.

Following the joining of the components, the assembly is machined to its final external configuration, with the exception of the piston pin and crankshaft pin bores. The cap portion 18 is then separated from shank portion 15. Heat treatment to the final desired condition is performed next, followed by shot peening to further increase fatigue resistance. The rod is then assembled, with the piston pin bushing 20, locating sleeves 24, washers 30 and bolts 28, or alternately studs 26 and nuts 32. The piston pin bore 38 and crankshaft bore 40 are then finish machined to size. Balancing to match the actual rod weight with that of others to be placed in the same engine assembly is accomplished as the final operation. This is accomplished by removing additional material, as required, from external cavities 44, 45, 46, and/or 47.

The presented method of manufacture and therefore the present invention, is particularly suited to the use of the low carbon, high alloy steels. These steels exhibit inherent high modulus of elasticity, and extremely high fatigue strength and high fracture toughness. Use of other materials of construction such as titanium and metal matrix composites is also made possible by the presented method of fabrication.

CONCLUSION; RAMIFICATION AND SCOPE

Thus the reader will see that the present invention provides a connecting rod that is optimized in its configuration at any given cross-section, i.e. it provides an optimized strength-to-weight ratio. It is also seen that the invention reduces the stresses imposed on mating engine components while reducing dynamically induced distortion of its crankshaft-pin end. An inherent aerodynamic profile adds to the benefits of the invention. The method of fabrication allows the use of wrought materials that possess desirable strength and fatigue properties and is based on sound metallurgical processes. These features all combine to maximize the fatigue strength and cycle life of the connecting rod in high stress applications.

Although the description above contains many specificities, these should not be construed as limiting the scope of the invention, but merely providing illustrations of some of the presently preferred embodiments of this invention. Accordingly, the scope of the invention should be determined not by the embodiments illustrated, but by the appended claims and their legal equivalents.

I claim as my invention:

1. A connecting rod for an internal combustion engine comprising a shank portion with a closed, cylindrical end to accept a piston pin forming a first bore of specified size and an opposite semi-cylindrical end to accept a crankshaft pin, a cap portion semi-cylindrical in shape, that forms a second bore of specified size with said shank portion semi-cylindrical end, said second bore being parallel to said first bore, said shank portion having an external cross section that has a smaller cross section at said cylindrical end than at said semi-cylindrical end, said shank portion being hollow and having multiple adjoining walls of specified thicknesses, wherein said adjoining walls have a combined cross-sectional area that is substantially constant in mutually parallel planes that are both parallel to both said first bore and said second bore and normal to an axis plane that intersects the axes of both said first bore and said second bore.

2. The rod of claim 1 wherein said hollow shank contains a single internal cavity formed by said adjoining walls.

3. The rod of claim 1 wherein said constant cross-sectional area is provided by varying said thicknesses of said adjoining walls.

4. The rod of claim 1 wherein said hollow shank contains multiple internal cavities.

5. The rod of claim 1 wherein said hollow shank contains multiple internal cavities and multiple external pockets.

* * * * *